US012601852B2

(12) United States Patent
Gerardiere et al.

(10) Patent No.: US 12,601,852 B2
(45) Date of Patent: Apr. 14, 2026

(54) PRESENCE DETECTION DEVICE WITH A RADIO ANTENNA, FOR A MOTOR VEHICLE

(71) Applicant: VITESCO TECHNOLOGIES GMBH, Regensburg (DE)

(72) Inventors: Olivier Gerardiere, Toulouse (FR); Xavier Hourne, Toulouse (FR); Jérome Wroblewski, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 243 days.

(21) Appl. No.: 18/703,566

(22) PCT Filed: Dec. 2, 2022

(86) PCT No.: PCT/EP2022/084181
§ 371 (c)(1),
(2) Date: Apr. 22, 2024

(87) PCT Pub. No.: WO2023/110449
PCT Pub. Date: Jun. 22, 2023

(65) Prior Publication Data
US 2024/0427049 A1 Dec. 26, 2024

(30) Foreign Application Priority Data
Dec. 16, 2021 (FR) ....................................... 2113612

(51) Int. Cl.
*G01V 3/08* (2006.01)
*G01S 13/86* (2006.01)
(52) U.S. Cl.
CPC .............. *G01V 3/088* (2013.01); *G01S 13/86* (2013.01)

(58) Field of Classification Search
None
See application file for complete search history.

(56) References Cited

U.S. PATENT DOCUMENTS 6,127,989 A    10/2000  Kunz
7,466,284 B2   12/2008  Barry
(Continued)

FOREIGN PATENT DOCUMENTS

DE    102018122254 B3   12/2019
WO    2005074402 A2     8/2005
WO    2014085649 A2     6/2014

OTHER PUBLICATIONS

International Search Report and Written Opinion of the ISA for PCT/EP2022/084181, mailed Feb. 20, 2023, 15 pages.

*Primary Examiner* — Whitney Moore
(74) *Attorney, Agent, or Firm* — Nixon & Vanderhye

(57) ABSTRACT

A system intended to be installed on a motor vehicle, comprising:
  a capacitive electrode (110), for implementing capacitive type presence detection;
  a transmitting and receiving antenna (120), surrounding the capacitive electrode (110);
  an electrically conductive line (130), located between the capacitive electrode and the transmitting and receiving antenna;
  a reference capacitor, connected between the capacitive electrode (110) and the electrically conductive line (130); and
  a microcontroller, configured to measure a voltage representing the capacitance of the measurement capacitor.
The invention allows the sensitivity of presence detection by the capacitive electrode to be improved.

9 Claims, 3 Drawing Sheets

(56) References Cited

U.S. PATENT DOCUMENTS

| | | | |
|---|---|---|---|
| 9,354,698 B2 | 5/2016 | Alameh et al. | |
| 10,088,955 B2 | 10/2018 | Konopka | |
| 10,438,425 B2 | 10/2019 | Mcleod et al. | |
| 2008/0129623 A1 | 6/2008 | Barry | |
| 2016/0117875 A1* | 4/2016 | Duchemin | H03K 17/955 |
| | | | 340/5.72 |
| 2017/0249032 A1 | 8/2017 | Konopka | |
| 2018/0012430 A1 | 1/2018 | Mcleod et al. | |

\* cited by examiner

PRESENCE DETECTION DEVICE WITH A RADIO ANTENNA, FOR A MOTOR VEHICLE

CROSS-REFERENCE TO RELATED APPLICATIONS

This application is the U.S. national phase of International Application No. PCT/EP2022/084181 filed Dec. 2, 2022, which designated the U.S. and claims priority to FR 2113612 filed Dec. 16, 2021, the entire contents of each of which are hereby incorporated by reference.

TECHNICAL FIELD

The invention relates to the field of motor vehicles, and more specifically to the field of capacitive type presence sensors used to detect a human presence and to trigger at least one function of the motor vehicle.

Preferably, but in a non-limiting manner, such sensors are used within the context of controlling access to the vehicle. When the presence of a user is detected in the immediate vicinity of the sensor, the sensor generates data that triggers the opening, respectively the closing, of an opening of the motor vehicle (notably, a side door or a rear tailgate).

Prior Art

Capacitive type sensors are known in the prior art for detecting the presence of a user in the immediate vicinity of the sensor.

Such sensors are based on the use of an electrode, called capacitive electrode, forming a measurement capacitor with the electrical ground. The proximity of part of the human body increases the electrical charge in the vicinity of the capacitive electrode, and therefore the capacitance value of the measurement capacitor. Charge measurements then allow the presence of a user in the immediate vicinity of the sensor to be detected.

Such sensors are used, for example, to anticipate the locking or unlocking of an opening of a motor vehicle. They are advantageously integrated within a door handle, or under the rear trunk. The part of the human body used for presence detection is preferably a hand of a user.

Capacitive type proximity sensors are also known in the prior art that are combined with a radiofrequency antenna in order to make access to the vehicle conditional upon user recognition.

The user recognition is based on a radiofrequency communication between a recognition device, incorporating the radiofrequency antenna, and a device carried by the user. During operation, the radiofrequency antenna emits an interrogation signal. The device carried by the user receives this interrogation signal, and returns an identification signal in response. The identification signal is received by the radiofrequency antenna and then used within the recognition device.

The device carried by the user can comprise a simple RFID tag, or tag. As a variant, it can be a smartphone, comprising a radiofrequency antenna and storing an identification datum.

An obvious solution for producing a device incorporating both a capacitive electrode and a radiofrequency antenna involves producing these two elements side-by-side on the same substrate. Obviously, a disadvantage of this solution is its significant spatial requirement.

In an alternative solution, the radiofrequency antenna surrounds the capacitive electrode, which provides optimal compactness. A disadvantage is that the sensitivity of the capacitive detection is reduced, due to the interactions between the capacitive electrode and the radiofrequency antenna.

An aim of the present invention is to propose a presence detection device with a radiofrequency antenna that is intended to be installed on a motor vehicle and that provides both a high level of compactness and optimal sensitivity for approach detection.

DISCLOSURE OF THE INVENTION

This aim is achieved with a system intended to be installed on a motor vehicle, the system comprising:

a capacitive electrode for implementing capacitive type presence detection; and a transmitting and receiving antenna, configured to transmit and receive a radiofrequency signal in order to identify a user; with the transmitting and receiving antenna surrounding the capacitive electrode. The system according to the invention further comprises an electrically conductive line, located between the capacitive electrode and the transmitting and receiving antenna, without direct physical contact with either the capacitive electrode or the transmitting and receiving antenna.

The measurement capacitor formed by the capacitive electrode can be divided into:

a capacitor, called useful capacitor, having a capacitance, called useful capacitance, with the value assumed by this capacitance being a function of the proximity of a target (in this case part of the human body); and a capacitance, called "parasitic" capacitance.

During use, the capacitive electrode and the transmitting and receiving antenna both form part of the same electrical circuit having an electrical ground with constant electrical potential at zero. Throughout the text, the ground designates the electrical ground.

The inventors have shown that the parasitic capacitance is mainly formed by capacitive coupling between the capacitive electrode and the ground.

In the prior art, where the capacitive electrode is only surrounded by the transmitting and receiving antenna, there is strong capacitive coupling between the capacitive electrode and the transmitting and receiving antenna. When measuring the charge of the measurement capacitor, the transmitting and receiving antenna is connected to ground. The proximity of the capacitive electrode to the transmitting and receiving antenna therefore results in significant parasitic capacitance, and therefore in a limited contribution of the useful capacitor to a measured charge value.

In the invention, the system comprises an electrically conductive line, located between the capacitive electrode and the transmitting and receiving antenna, without direct physical contact with either the capacitive electrode or the transmitting and receiving antenna. The electrically conductive line, when present, locally blocks the capacitive coupling between the capacitive electrode and the transmitting and receiving antenna.

In the system according to the invention, capacitive coupling then exists:

between the capacitive electrode and the electrically conductive line; and between the capacitive electrode and the transmitting and receiving antenna, only at the sites where the electrically conductive line does not extend between the transmitting and receiving antenna and the capacitive electrode.

The electrically conductive line is physically separate from the transmitting and receiving antenna, and is therefore able to be brought to a potential that is distinct from that of the transmitting and receiving antenna. The electrically conductive line is therefore able to be brought to an electrical potential that is distinct from that of the ground. The total value of parasitic capacitance is then significantly reduced, compared to the prior art.

This reduction in the parasitic capacitance value results in greater contribution of the useful capacitor to a measured charge value. Therefore, the sensitivity of the capacitive detection is increased, compared to the aforementioned prior art.

The invention thus provides a presence detection system with a radiofrequency antenna that is intended to be installed on a motor vehicle and that has both a high level of compactness and optimal sensitivity for approach detection.

In other words, the invention allows the capacitive electrode to be placed inside the transmitting and receiving antenna, without undermining the performance of the capacitive electrode.

According to the invention, the system also comprises the following elements:

a microcontroller provided with a plurality of input and/or output ports, wherein each input and/or output port is able to be brought to a determined potential and/or to be used to measure a voltage signal; and a reference capacitor connected to the same input and/or output port as the capacitive electrode; wherein the electrically conductive line is connected to the same input and/or output port as the reference capacitor.

The reference capacitor and the electrically conductive line thus define a discharge capacitor.

The system according to the invention is configured so that the measurement capacitor, formed between the capacitive electrode and the ground, is alternately charged and discharged in the discharge capacitor.

Furthermore, the microcontroller is configured to notably measure a voltage measurement representing the capacitance of the measurement capacitor.

In particular, the microcontroller is advantageously configured to control switches for opening and closing so as to:

charge the measurement capacitor (formed between the capacitive electrode and the ground); then transfer the charge from the measurement capacitor into the discharge capacitor (formed by the reference capacitor and a capacitor Cge defined between the electrically conductive line and the capacitive electrode); then measure the voltage at the terminals of the discharge capacitor.

The microcontroller can be configured to control switches for opening and closing so as to repeat these steps in the other direction (transfer the charge from the discharge capacitor to the measurement capacitor and measure the voltage at the terminals of the measurement capacitor).

The capacitance of the reference capacitor is advantageously strictly less than the capacitance of a measurement capacitor formed by the capacitive electrode in the absence of a target. In this case, a target designates any element that is outside the device and is capable of increasing the capacitance value of the measurement capacitor, for example, part of the human body. The absence of a target designates the absence of such a target within a 10 cm radius around the capacitive electrode.

In particular, the capacitance Cext of the reference capacitor is advantageously selected such that:

$$C(Cext)+C(Cge)=C_0(Ce),$$

with $C_0(Ce)$ being the capacitance of the measurement capacitor Ce in the absence of a target; C(Cext) being the capacitance of the reference capacitor Cext; and C(Cge) being the capacitance of the capacitor Cge formed by the capacitive coupling between the electrically conductive line and the capacitive electrode.

It will be understood that these features, relating to the value assumed by the capacitance Cext of the reference capacitor, are linked to the detection principle implemented in the system according to the invention, involving transferring charges between a measurement capacitor and a discharge capacitor.

Preferably, the electrically conductive line forms a continuous line.

The electrically conductive line advantageously forms an open line.

Advantageously, the electrically conductive line, when present, follows the periphery of the capacitive electrode.

Preferably, the capacitive electrode is surrounded by the electrically conductive line, over at least 80% of the periphery of the capacitive electrode.

In one advantageous embodiment, the capacitive electrode assumes the form of a square or a rectangle, which is surrounded, on three sides and over at least half of a fourth side, by the electrically conductive line.

A difference between the capacitance of the reference capacitor and the capacitance of the measurement capacitor in the absence of a target is advantageously greater than or equal to 1 pF.

The invention also relates to a motor vehicle equipped with a system according to the invention.

DESCRIPTION OF THE FIGURES

Further features and advantages of the invention will become more clearly apparent upon reading the following description. The description is purely illustrative and must be read with reference to the appended drawings, in which.

DETAILED DESCRIPTION OF AT LEAST ONE EMBODIMENT

For the sake of clarity, the axes of an orthonormal coordinate system (Oxyz) have been shown in at least some of the figures.

Figure 1:
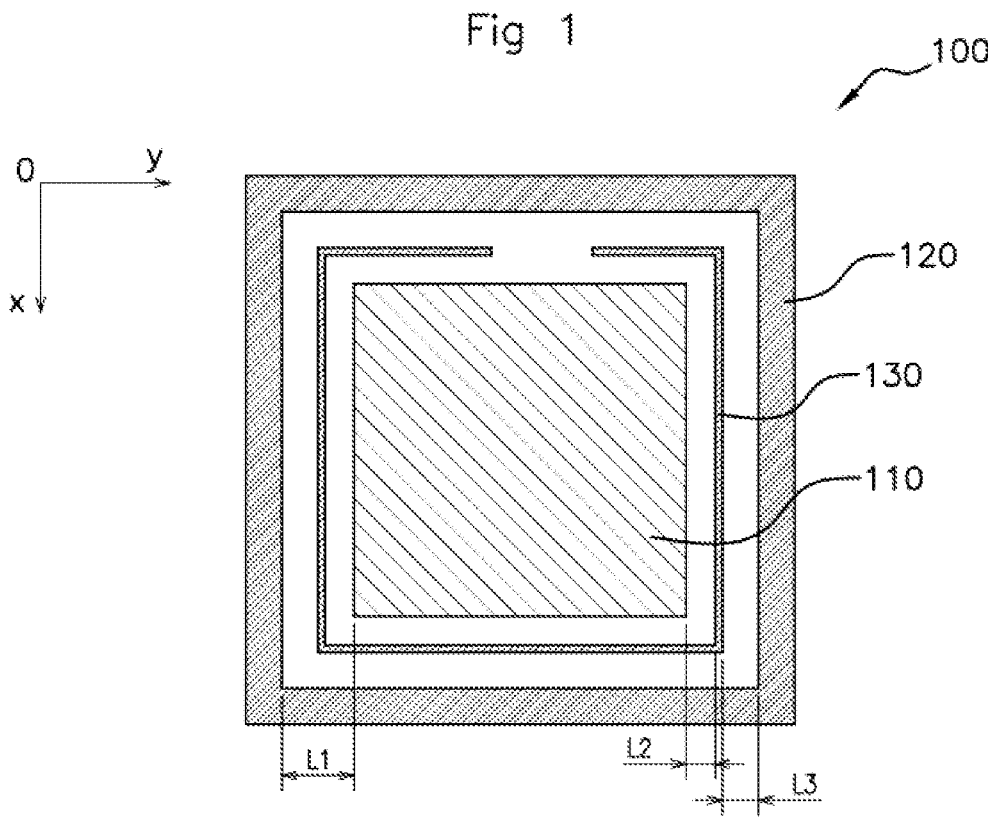
FIG. 1 schematically illustrates a device present in a system according to the invention, as a top view.

Firstly, an example of a device 100 according to the invention will be described, with the device 100 forming part of a system according to the invention as described hereafter. The device 100 is shown in FIG. 1 as a top view in a plane (Oxy).

The device 100 comprises the following elements, advantageously integrated on the same substrate (not shown):

a capacitive electrode 110;

a transmitting and receiving antenna 120; and an electrically conductive line 130.

The capacitive electrode 110 is formed from at least one electrically conductive material, and extends along a surface parallel to the plane (Oxy). Its thickness along the axis (Oz) is limited, with, for example, a ratio that is greater than or equal to 10, or even 20, between its greatest extent along a straight line parallel to the plane (Oxy), and its thickness defined along the axis (Oz) orthogonal to the plane (Oxy).

In this case, but in a non-limiting manner, the capacitive electrode 110 extends in the plane (Oxy) as a solid square or rectangular form. However, the invention is not limited to this form, and also relates to numerous variants in which the capacitive electrode 110 extends in the plane (Oxy) as any solid or even non-solid form.

The capacitive antenna 110 is intended to form a measurement capacitor with its environment in order to implement capacitive type presence detection.

The transmitting and receiving antenna 120 is configured to transmit and/or receive a radiofrequency signal. Throughout the text, a radiofrequency signal designates an electromagnetic frequency signal located between 3 kHz and 300 GHz. The transmitting and receiving antenna 120 is preferably an antenna of the NFC (Near Field Communication) type, adapted for exchanges of short-range and high-frequency radiofrequency signals, up to distances of the order of around ten centimeters.

The transmitting and receiving antenna 120 is made up of at least one turn. Various possible arrangements for said turns are described hereafter.

The transmitting and receiving antenna 120 surrounds a region inside which the capacitive electrode 110 is located. The capacitive electrode 110 is completely surrounded by the transmitting and receiving antenna 120.

Preferably, the transmitting and receiving antenna 120 is formed by at least one metal deposit that extends over the same substrate as the capacitive electrode 110.

In any case, the capacitive electrode 110 and the transmitting and receiving antenna 120 are advantageously arranged so as to be coplanar.

Preferably, an edge-to-edge distance L1 between the capacitive electrode 110 and the transmitting and receiving antenna 120 is constant, over the entire profile of the capacitive electrode 110. In this case, the transmitting and receiving antenna 120 then assumes a square or rectangular form, as a top view in a plane (Oxy).

Preferably, the edge-to-edge distance L1 in the device 100 according to the invention is the same order of magnitude as the corresponding distance in the devices of the prior art. In other words, adding the electrically conductive line 130 does not necessarily result in an increase in a spacing between the capacitive electrode 110 and the transmitting and receiving antenna 120. Indeed, even in the absence of an electrically conductive line 130 between the two, it is preferable for the capacitive electrode 110 and the transmitting and receiving antenna 120 to be sufficiently spaced apart in order to avoid degrading the performance capabilities of the antenna.

The electrically conductive line 130 extends between the capacitive electrode 110 and the transmitting and receiving antenna 120, without direct physical contact between the two. It is therefore able to be brought to a desired electrical potential, distinct from that of the transmitting and receiving antenna 120.

Preferably, the electrically conductive line 130 is formed by at least one metal deposit, which extends over the same substrate as the capacitive electrode 110 and the transmitting and receiving antenna 120.

Preferably, the electrically conductive line 130 is arranged so as to be coplanar with the capacitive electrode 110. Advantageously, the transmitting and receiving antenna 120 is arranged so as to be at least partially coplanar with the electrically conductive line and the capacitive electrode.

Advantageously, the width of the electrically conductive line 130 is very narrow, as defined in a plane (Oxy) parallel to the plane of the capacitive electrode 110. This width ranges, for example, between 0.1 mm and 0.5 mm, for example, it is equal to 0.2 mm. In any case, the width of the electrically conductive line is advantageously greater than the width of turns forming the transmitting and receiving antenna 120.

As explained in the disclosure of the invention, the capacitive electrode 110 forms a measurement capacitor, which can be divided into a useful capacitor, the capacitance of which is a function of the position of the target relative to the capacitive electrode 110, plus a parasitic capacitance.

During operation, the electrically conductive line 130 is not connected to the ground of a circuit receiving the elements of the device 100. The coupling between the capacitive electrode 110 and the ground is therefore less, so that the parasitic capacitance is reduced. The contribution of the capacitance of the useful capacitor to the total capacitance value of the measurement capacitor is therefore increased compared to the prior art. Therefore, the sensitivity of the presence detection is also increased.

Simulations have shown that the invention allows the measurement capacitor to transition, for example, from a capacitance of approximately 15 pF to a capacitance of approximately 12 pF. This corresponds to a 3 pF reduction of the parasitic capacitance. These values are provided by way of an illustration, and the invention is clearly not limited to these values.

Figure 2:
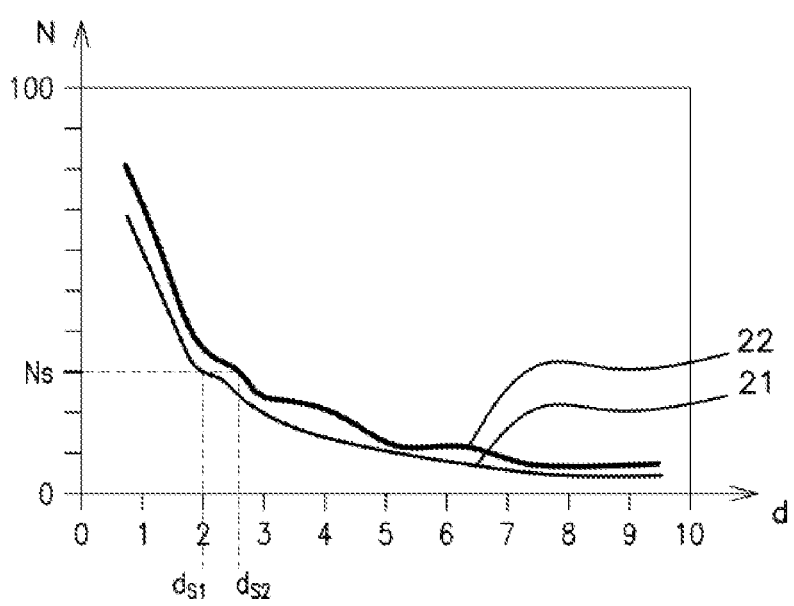
FIG. 2 illustrates the evolution of a variation in capacitance of the measurement capacitor as a function of a distance to the target, in a device as illustrated in FIG. 1 and in a device according to the prior art.

FIG. 2 illustrates the result of simulations showing the improvement in the sensitivity of the presence detection. In FIG. 2, the abscissa axis is a distance d between a target and the capacitive electrode, in mm, where the target is the hand of a human operator, for example. The ordinate axis is a variation N of the capacitance of the measurement capacitor, when the target appears in the vicinity of the capacitive electrode, at a distance d from the capacitive electrode.

The curve 21 relates to a device according to the prior art, with the capacitive electrode surrounded by the antenna and with the antenna connected to the ground, without a conductive line between the two. The curve 22 relates to a device according to the invention, with the antenna connected to the ground and with the conductive line connected to a potential distinct from the ground.

FIG. 2 shows that, for the same capacitance variation value $N_S$, the invention allows a corresponding distance value between the target and the capacitive electrode to be increased ($d_{S1}$ in the prior art as opposed to $d_{S2}$ in the invention).

$N_S$ is, for example, a threshold value, beyond which a human operator is considered to be in the vicinity of the capacitive electrode. The higher this threshold value, the more reliable the presence detection. This threshold value is associated with a distance, called detection limit distance, between the capacitive electrode and the human operator. Therefore, it can be seen that the invention allows the detection limit distance to be increased.

Another solution for increasing the detection limit distance can involve reducing the value of $N_S$, but this then results in a less robust device, with less reliability with respect to presence detection.

Advantageously, and as shown in FIG. 1, the edge-to-edge distance L2 between the capacitive electrode 110 and the electrically conductive line 130 is constant, along the whole of the electrically conductive line 130. In other words, the electrically conductive line 130, when present, follows the periphery of the capacitive electrode 110. However, the invention also relates to variants in which the electrically conductive line 130 does not follow the form of the capacitive electrode 110.

Preferably, the edge-to-edge distance L2 between the capacitive electrode 110 and the electrically conductive line 130 is strictly less than the edge-to-edge distance L3 between the electrically conductive line 130 and the transmitting and receiving antenna 120. For example, an L3:L2 ratio is greater than or equal to 2, or is even greater than or equal to 3.

According to the invention, the electrically conductive line 130 can extend facing only part of the periphery of the capacitive electrode 110. The electrically conductive line 130 can assume, for example, the form of a simple straight line, extending along only one side of the capacitive electrode 110.

However, it is understood that it is advantageous, in order to minimize the parasitic capacitance, for the extent of the electrically conductive line 130 to be maximized along the periphery of the capacitive electrode 110.

Preferably, the electrically conductive line 130 does not completely surround the capacitive electrode 110. An electrically conductive line 130 completely surrounding the capacitive electrode 110 in fact forms an electrically conducting ring through which an electric current flows. This current generates an electromagnetic field that opposes the electromagnetic field emitted by the transmitting and receiving antenna 120, and therefore disrupts the user recognition function.

Thus, the conductive electrical line 130 advantageously forms an open line, extending between the capacitive electrode 110 and the transmitting and receiving antenna 120. In other words, there is no direct physical contact between two non-neighboring points of said line 130.

Advantageously, the capacitive electrode 110 is surrounded by the electrically conductive line 130, over at least 80% and at most 98% of the periphery of the capacitive electrode 110. Thus, the capacitive electrode 110 is almost completely surrounded by the electrically conductive line 130, as illustrated in FIG. 1.

In an advantageous embodiment, as shown in FIG. 1, the capacitive electrode 110 assumes the form of a square or of a rectangle, which is surrounded, on three sides and over at least half of a fourth side, by the electrically conductive line 130.

The electrically conductive line 130 must be brought to a predetermined potential. It therefore advantageously extends in the form of a continuous line, formed as a single piece. However, the invention also relates to variants in which said electrically conductive line 130 is discontinuous, formed, for example, by at least two elementary lines that are distinct from each other, extending one after the other along the periphery of the capacitive electrode 110. In this case, said elementary lines are advantageously each brought to the same electrical potential.

Figure 3A:
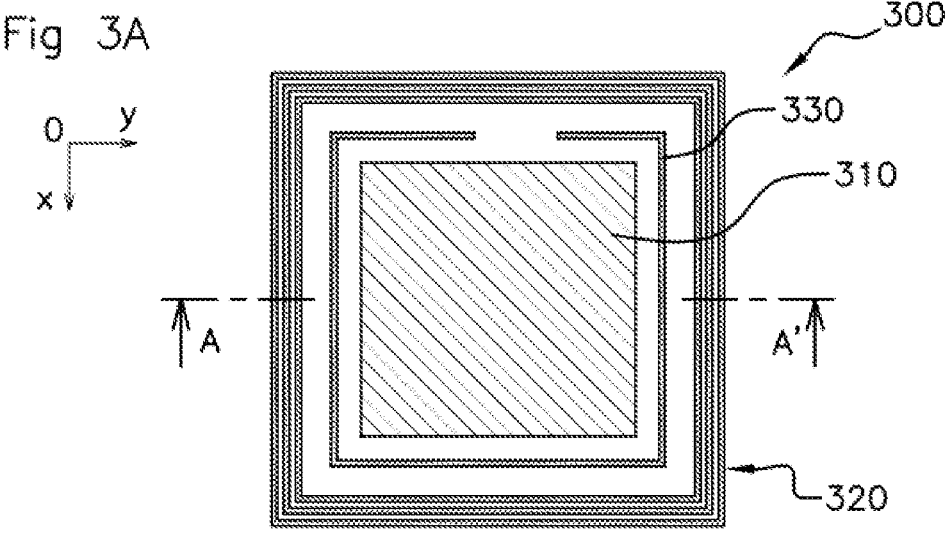
FIG. 3A illustrates a first variant of a device as shown in FIG. 1, as a top view.
Figure 3B:
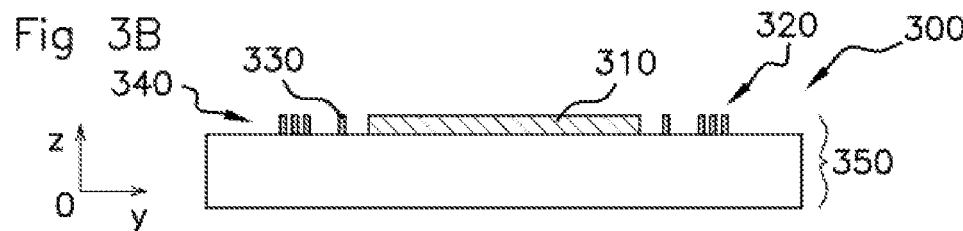
FIG. 3B illustrates the device of FIG. 3A, as a section view.

FIGS. 3A and 3B illustrate a first variant of the device of FIG. 1, respectively as a top view in a plane (Oxy), and as a section view in a plane AA' parallel to the plane (Oyz).

In the device 300 of FIGS. 3A and 3B, the capacitive electrode 310, the transmitting and receiving antenna 320, and the electrically conductive line 330 are all formed in the same electrically conductive layer 340 of a substrate 350.

In this variant, the transmitting and receiving antenna 320 is made up of coplanar concentric turns, arranged so as to be coplanar with the capacitive electrode 310 and the transmitting and receiving antenna 320.

Figure 4A:
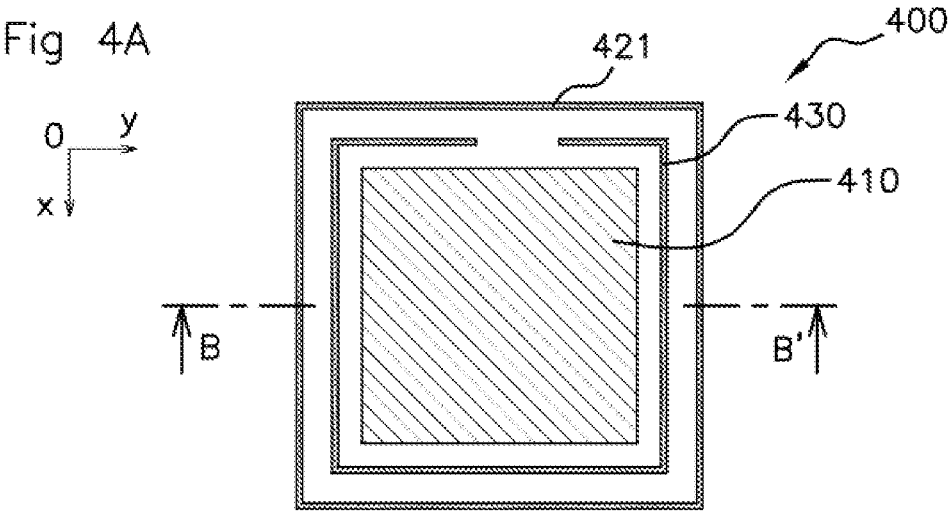
FIG. 4A illustrates a second variant of a device as shown in FIG. 1, as a top view.
Figure 4B:
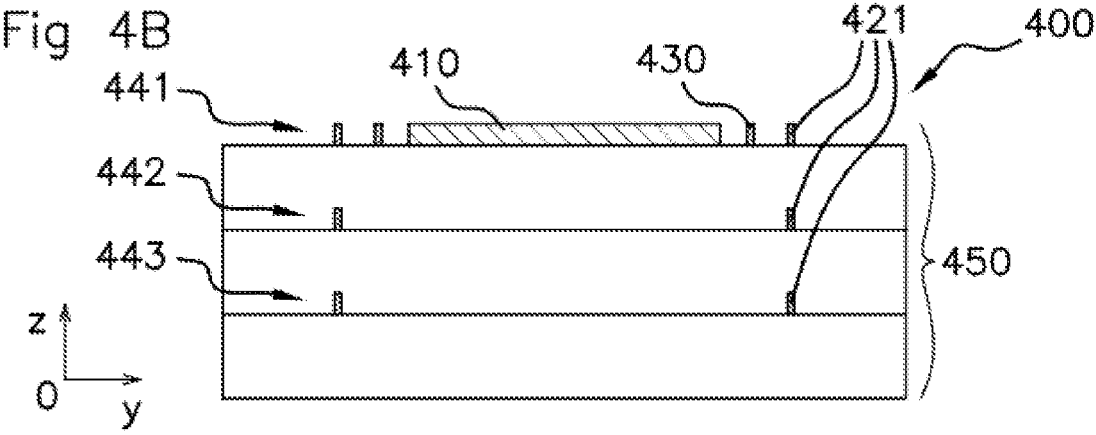
FIG. 4B illustrates the device of FIG. 4A, as a section view.

FIGS. 4A and 4B illustrate a second variant of the device of FIG. 1, respectively as a top view in a plane (Oxy), and as a section view in a plane BB' parallel to the plane (Oyz).

In the device 400 of FIGS. 4A and 4B, the capacitive electrode 410 and the electrically conductive line 430 are all formed in the same electrically conductive layer 441 of a substrate 450.

The substrate 450 is a multilayer substrate, comprising a plurality of conductive layers 441, 442, 443 spaced apart in pairs by a respective electrically insulating layer.

The transmitting and receiving antenna is made up of concentric turns 421, each located in a conductive layer 441, 442, respectively 443, of the substrate 450. The turns are connected in pairs by a respective via, not shown, extending orthogonal to the plane of the substrate 450 and passing through a respective layer of the electrically insulating layers.

In the variants of FIGS. 3A and 3B, respectively of FIGS. 4A and 4B, the transmitting and receiving antenna is arranged so as to be at least partially coplanar with the electrically conductive line and the capacitive electrode. In particular, at least one of the turns of the transmitting and receiving antenna is arranged so as to be coplanar with the electrically conductive line and the capacitive electrode.

The invention also relates to variants in which the turns of the transmitting and receiving antenna extend at an angle relative to the plane (Oxy) of the capacitive electrode. In this case, the transmitting and receiving antenna and the capacitive electrode are not integrated in the same substrate.

Figure 5:
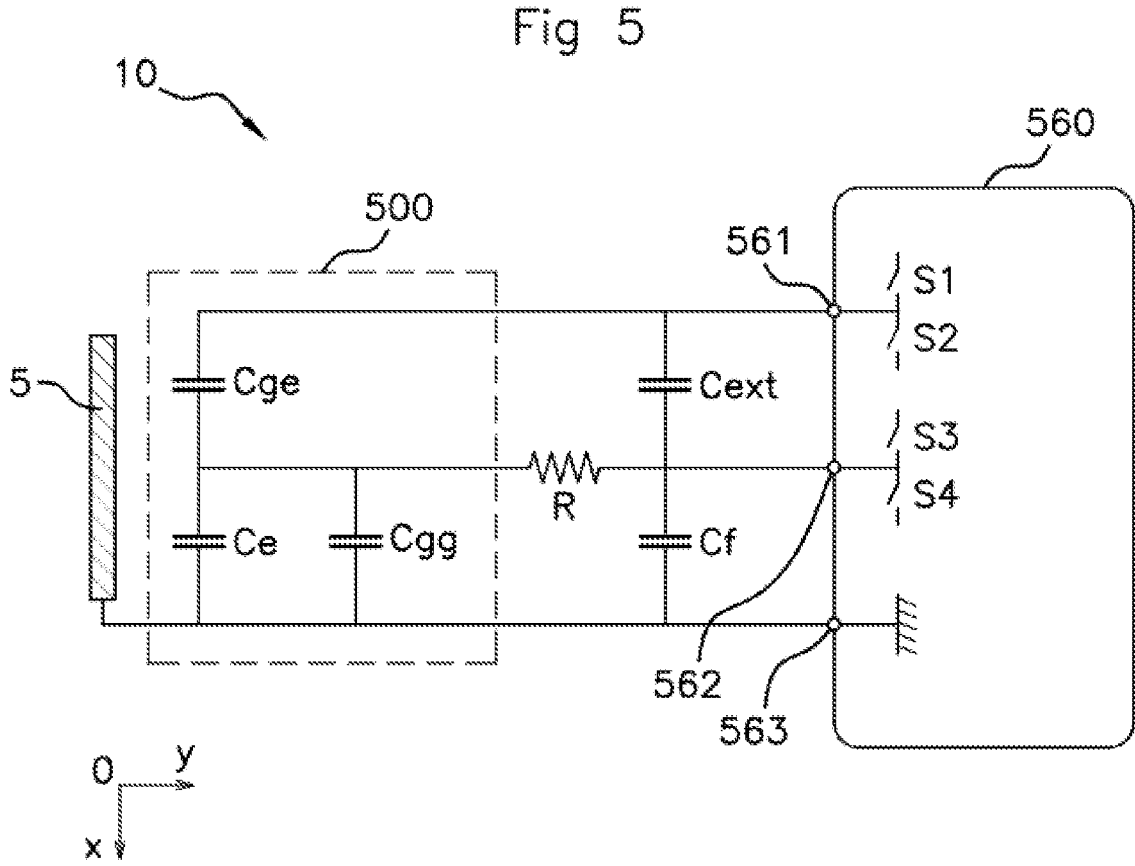
FIG. 5 schematically illustrates a system according to the invention.

Finally, with reference to FIG. 5, a particularly advantageous example of a system 10 according to the invention is described.

The system 10 comprises:
  a device 500 according to the invention, comprising a capacitive electrode, an electrically conductive line and a transmitting and receiving antenna, not shown as such;
  a microcontroller 560; and
  a reference capacitor Cext.

FIG. 5 also schematically shows a target 5 in the vicinity of the device 500 according to the invention.

In FIG. 5, the system 10 is schematically shown by its equivalent circuit. This equivalent circuit comprises:
  a measurement capacitor Ce, defined between the capacitive electrode and the ground, the capacitance of which is the sum of a useful capacitance, related to the electrostatic field supplied by the target 5 when it is present, and of a parasitic capacitance that does not depend on the presence or absence of the target 5;
  a capacitor Cge, corresponding to the capacitive coupling between the electrically conductive line and the capacitive electrode; and a capacitor Cgg, corresponding to the capacitive coupling between the electrically conductive line and the ground, and mounted parallel to the capacitor Ce.

The microcontroller 560 notably comprises switches, in this case referenced S1, S2, S3, S4, and a plurality of input and/or output ports 561, 562, 563. Each input and/or output port 561, 562, 563 is able to be brought to a determined potential and/or to be used to measure a voltage signal. In this case, the ports 561, 562 are each able to be used to measure a voltage signal, while the port 563 is grounded. The microcontroller 560 comprises at least one memory and at least one processor (not shown). It is notably configured to control the switches S1, S2, S3, S4, notably in order to measure a voltage representing the charge, and therefore the capacitance of the measurement capacitor Ce.

The terminals of the reference capacitor Cext are respectively connected to the input and/or output port 561, and to the input and/or output port 562 of the detection circuit 560.

The capacitive electrode of the device 500 is connected to the input and/or output port 562.

The measurement capacitor Ce is defined between the capacitive electrode of the device 500 and the ground. Thus, the terminals of the measurement capacitor Ce, in the equivalent circuit, are respectively connected to the input and/or output port 562 and to the ground (input and/or output port 563).

In this case, and advantageously, the electrically conductive line of the device 500 is connected to the same input and/or output port 561 as the reference capacitor Cext, distinct from the input and/or output port 562 to which the capacitive electrode is connected. The electrically conductive line of the device 500 is therefore controlled like the reference capacitor Cext. Thus, in the equivalent circuit, the capacitor Cge (representing capacitive coupling of the electrically conductive line) is mounted parallel to the reference capacitor Cext. In other words, the electrically conductive line is electrically connected to a voltage controlled by the microcontroller of the circuit 560, such that the capacitance formed between the capacitive electrode and the electrically conductive line is set parallel to the capacitance Cext. In any case, this input and/or output port 561 is distinct from the ground.

The reference capacitor Cext and the capacitor Cge thus can be considered to be equivalent to one and the same discharge capacitor, not shown.

The measurement capacitor Ce and said discharge capacitor are mounted together in a capacitive divider bridge type arrangement (or "capacitive voltage divider").

The system 10 is configured so that the measurement capacitor Ce, defined between the capacitive electrode and the ground, can be alternately charged and discharged in the discharge capacitor. When discharging the measurement capacitor Ce in the discharge capacitor, the charges balance between the two capacitors and it is possible to detect the presence of a target as a function of a voltage signal representing the discharging (and therefore before charging) of said measurement capacitor Ce.

In particular, the microcontroller 560 is advantageously configured for controlling the opening and closing of the switches S1, S2, S3, S4 so as to:

charge the measurement capacitor Ce, formed between the capacitive electrode and the ground; then transfer the charge from the measurement capacitor Ce to the discharge capacitor formed by the reference capacitor Cext and the capacitor Cge; then measure the voltage at the terminals of the discharge capacitor.

The microcontroller 560 can be configured for controlling the opening and closing of the switches S1, S2, S3, S4 so as to repeat these steps in the other direction (transfer the charge from the discharge capacitor (Cext+Cge) to the measurement capacitor Ce and measure the voltage at the terminals of the measurement capacitor Ce).

The use of such an assembly, with a discharge capacitor, is known from the prior art. The idea in this case involves ingeniously connecting the electrically conductive line of the device 500, so as to integrate the capacitor Cge, unintentionally formed by the presence of said electrically conductive line in the device 500, in the discharge capacitor. Thus, this not only overcomes any undesirable effects provided by the electrically conductive line, but a technical advantage is provided that allows the capacitance of the capacitor Cext to be reduced.

In a manner per se known, it is advantageous for the capacitance of the measurement capacitor Ce, in the absence of a target, to be close to the capacitance of the discharge capacitor.

In this case, the capacitance of the discharge capacitor is equal to the sum of the respective capacitances of the capacitors Cext and Cge.

Advantageously, Ce, Cext and Cge verify:

$$C_0(Ce)=C(Cext)+C(Cge) \qquad \text{[Math 1]}$$

with $C_0(Ce)$ being the capacitance of the capacitor Ce in the absence of a target, C (Cext) being the capacitance of the capacitor Cext, and C(Cge) being the capacitance of the capacitor Cge.

It should be noted that the capacitance $C_0(Ce)$ of the capacitor, in the absence of a target, corresponds to the parasitic capacitance of the measurement capacitor Ce referred to above.

In any case, the capacitance C(Cext) of the reference capacitor Cext is preferably strictly less than the capacitance $C_0(Ce)$ of the measurement capacitor Ce in the absence of a target.

The capacitance C(Cge) of the capacitor Cge ranges, for example, between 1 pF and 10 pF, more preferably between 2 pF and 6 pF, for example, equal to 4 pF. The difference between the capacitance C(Cext) of the reference capacitor Cext and the capacitance $C_0(Ce)$ of the measurement capacitor in the absence of a target then advantageously ranges between 1 pF and 10 pF, more preferably between 2 pF and 6 pF, for example, equal to 4 pF.

It is understood that C(Cge) advantageously must be less than $C_0(Ce)$ (otherwise it is impossible to verify the equation [Math 1]). The value of C(Cge) can be adapted to a desired value, notably by adjusting the edge-to-edge distance L2 between the electrically conductive line and the capacitive electrode (see FIG. 1).

In practice, the input and/or output port 561 preferably delivers a slot voltage. In any case, the electrically conductive line must not be continuously connected to the ground (port 563, in this case), since the disadvantages of the prior art would then be encountered.

It should be noted that the equivalent circuit shown in FIG. 5 also comprises:

the aforementioned capacitor Cgg, corresponding to the capacitive coupling between the electrically conductive line and the ground;

a capacitor Cf, intended for filtering electromagnetic interference, and connected between the input and/or output port 562 and the ground; and a resistor R, used for filtering electromagnetic interference.

The capacitor Cgg is mounted parallel to the capacitor Ce. It does not affect the charge and/or discharge measurements of the capacitor Ce since it is controlled at low impedance.

The system according to the invention is advantageously integrated within a motor vehicle, even more preferably within a door handle.

The system according to the invention is advantageously integrated in a system for controlling the locking and/or unlocking of an opening of a motor vehicle, using user presence data and user identification data provided by the device according to the invention.

The system according to the invention preferably comprises a single capacitive electrode, dedicated to controlling the locking and, respectively, the unlocking of an opening. As a variant, the system according to the invention comprises exactly two capacitive electrodes, one of which is dedicated to controlling the locking of an opening and the other one of which is dedicated to controlling the unlocking of an opening.

The invention is not limited to the examples described above, and also relates to numerous other variants, notably with other forms for the capacitive electrode, other forms for the electrically conductive line, other forms for the transmitting and receiving antenna, other capacitance values, etc. Furthermore, the system according to the invention can be intended for controlling functions other than access to the vehicle, for example, for automatically triggering lighting.

The invention claimed is:

1. A system (700) intended to be installed on a motor vehicle, comprising:
   a capacitive electrode (110; 310; 410), configured to form, with the ground, a measurement capacitor for implementing capacitive type presence detection;
   a transmitting and receiving antenna (120; 320; 420), configured to transmit and receive a radiofrequency signal in order to identify a user, the transmitting and receiving antenna (120; 320; 420) surrounding the capacitive electrode (110; 310; 410);
   an electrically conductive line (130; 330; 430), located between the capacitive electrode and the transmitting and receiving antenna, without direct physical contact with either the capacitive electrode or the transmitting and receiving antenna; and
   a microcontroller provided with a plurality of input and/or output ports (561, 562, 563), where each input and/or output port is able to be brought to a determined potential and/or to be used to measure a voltage signal;

characterized in that the system (770) further comprises a reference capacitor (Cext), and in that:
   one terminal of the reference capacitor (Cext) is connected to the same first input and/or output port (562) as the capacitive electrode; and
   the other terminal of the reference capacitor (Cext) is connected to the same second input and/or output port (561) as the electrically conductive line;
with the reference capacitor (Cext) and the electrically conductive line (130; 330; 430) thus defining a discharge capacitor,
the system (700) being configured so that the measurement capacitor, formed between the capacitive electrode and the ground, can be alternately charged and discharged in the discharge capacitor, and the microcontroller notably being configured to measure a voltage representing the capacitance of the measurement capacitor.

2. The system (700) as claimed in claim 1, characterized in that the electrically conductive line (130; 330; 430) forms a continuous line.

3. The system (700) as claimed in claim 1, characterized in that the electrically conductive line (130; 330; 430) forms an open line.

4. The system (700) as claimed in claim 1, characterized in that the electrically conductive line (130; 330; 430), when present, follows the periphery of the capacitive electrode (110; 310; 410).

5. The system (700) as claimed in claim 1, characterized in that the capacitive electrode (110; 310; 410) is surrounded by the electrically conductive line (130; 330; 430), over at least 80% of the periphery of the capacitive electrode.

6. The system (700) as claimed in claim 1, characterized in that the capacitive electrode (110; 310; 410) assumes the form of a square or a rectangle, which is surrounded, on three sides and over at least half of a fourth side, by the electrically conductive line (130; 330; 430).

7. The system (10) as claimed in claim 1, wherein the capacitance of the reference capacitor (Cext) is strictly less than the capacitance of the measurement capacitor (Ce) in the absence of a target.

8. The system (10) as claimed in claim 1, wherein a difference between the capacitance of the reference capacitor (Cext), and the capacitance of the measurement capacitor (Ce) in the absence of a target is greater than or equal to 1 pF.

9. A motor vehicle equipped with a system (10) as claimed in claim 1.

* * * * *